United States Patent [19]
Lamphron

[11] Patent Number: 5,867,739
[45] Date of Patent: Feb. 2, 1999

[54] ONE-TIME-USE CAMERA WITH BREAK-AWAY RETAINER FOR REMOVABLE PLUG

[75] Inventor: Mark A. Lamphron, Rochester, N.Y.

[73] Assignee: Eastman Kodak Company, Rochester, N.Y.

[21] Appl. No.: 831,817

[22] Filed: Apr. 2, 1997

[51] Int. Cl.⁶ .................................................. G03B 17/00
[52] U.S. Cl. .............................. 396/6; 396/536; 396/538
[58] Field of Search .................................. 396/6, 536, 538

[56] References Cited

U.S. PATENT DOCUMENTS

| | | |
|---|---|---|
| 4,884,087 | 11/1989 | Mochida et al. . |
| 4,890,130 | 12/1989 | Takei et al. . |
| 4,954,857 | 9/1990 | Mochida et al. . |
| 4,954,858 | 9/1990 | Ohmura et al. . |
| 5,063,400 | 11/1991 | Takei et al. . |
| 5,600,395 | 2/1997 | Balling et al. . |

FOREIGN PATENT DOCUMENTS 3-2335  1/1991  Japan .

*Primary Examiner*—David M. Gray
*Attorney, Agent, or Firm*—Roger A. Fields

[57] ABSTRACT

A one-time-use camera comprising a plug which must be separated from a chamber to permit removal of an article from the chamber, and a breakable retainer for the plug which is broken to allow the plug to be separated from the chamber, is characterized in that the plug and the retainer have respective engaged portions arranged relative to one another to make the plug be separated from the chamber as the retainer is broken.

5 Claims, 6 Drawing Sheets

ONE-TIME-USE CAMERA WITH BREAK-AWAY RETAINER FOR REMOVABLE PLUG

FIELD OF THE INVENTION

The invention relates generally to the field of photography, and in particular to one-time-use cameras. More specifically, the invention relates to a one-time-use camera with a break-away retainer for a removable plug. The plug is intended to seal a chamber for a film cartridge, a film roll, or a battery in the camera.

BACKGROUND OF THE INVENTION

Film and cameras that are all in one, commonly referred to as single-use or one-time-use cameras, have become well known. Typically, the one-time-use camera is a simple point-and-shoot type comprising a plastic main body part which supports a film cartridge in a cartridge receiving chamber, a film take-up spool in a film supply chamber, a fixed-focus taking lens, a film metering mechanism with a rotatably supported metering sprocket, a manually rotatable film advance thumbwheel rotatably engaged with a film spool inside the film cartridge, a single-blade shutter, a manually depressible shutter release button, a frame counter for indicating the number of exposures remaining for picture-taking, a direct see-through viewfinder, and in some models an electronic flash. A pair of plastic front and rear cover parts house the main body part between them to complete the camera unit. The rear cover part connects to the main body part and/or to the front cover part to make the main body part light-tight. A decorative cardboard outer box or label at least partially contains the camera unit and may have respective openings for the taking lens, the shutter release button, the film advance thumbwheel, the viewfinder, the frame counter, and a flash emission window for the electronic flash.

To use the one-time-use camera, after the photographer takes a picture, he or she manually rotates the thumbwheel in a film winding direction to rotate the film spool inside the film cartridge, to wind an exposed section of the filmstrip into the film cartridge. The rewinding movement of the filmstrip the equivalent of slightly more than one frame width rotates the metering sprocket (in engagement with the filmstrip) to decrement the frame counter to its next lower-numbered setting and to pivot a metering lever into engagement with the thumbwheel to prevent further manual rotation of the thumbwheel. Manually depressing the shutter release button to take another picture pivots the metering lever out of engagement with the thumbwheel to permit renewed rotation of the thumbwheel. When the maximum number of exposures available on the filmstrip are exposed, and the filmstrip is completely wound off the take-up spool and rewound into the film cartridge, the one-time-use camera is given to a photofinisher who tears the outer box off the camera unit, separates the rear cover part from the main body part, and removes the film cartridge with the exposed filmstrip from the cartridge receiving chamber. Then, he removes the exposed filmstrip from the film cartridge to develop the negatives and make prints for the customer, and he forwards the used camera parts to the manufacturer for recycling, i.e. remanufacture.

Typically, during original manufacture or recycling (remanufacture) of the one-time-use camera, a film leader protruding from the film cartridge is attached to the film take-up spool, the film cartridge and the film take-up spool are loaded into the cartridge receiving and film supply chambers, and an intermediate leader section which bridges the film take-up spool and the film cartridge is engaged with the metering sprocket. Then, the front and rear cover parts are connected to the main body part and/or to the front cover part to complete the camera unit. Then, an engageable end of the take-up spool which protrudes from the film roll chamber is rotated to factory prewind substantially the entire length of the unexposed filmstrip from the film cartridge onto the film take-up spool and to rotate the metering sprocket to increment the frame counter to its total-available frame number setting. Lastly, the outer box is placed on the camera unit.

Prior art U.S. Pat. No. 4,954,858, issued Sep. 4, 1990, discloses in FIG. 8 and FIG. 9 a one-time-use camera comprising a plug which must be separated from a cartridge receiving chamber to permit removal of a film cartridge from the chamber, and a retainer for the plug which is broken or torn away to allow the plug to be separated from the chamber. Specifically, the plug is a light-tight integral cover portion of the rear cover part, which seals the chamber for the film cartridge, and the retainer is an integral tear-away portion of the outer box, which normally covers the cover portion to prevent it from being pivoted open to uncover the chamber. When the one-time-use camera is given to a photofinisher, he first tears away the tear-away portion along a line of perforations and then opens the cover portion and removes the film cartridge from the chamber.

SUMMARY OF THE INVENTION

A one-time-use camera comprising a plug which must be separated from a chamber to permit removal of an article from the chamber, and a breakable retainer for the plug which is broken to allow the plug to be separated from the chamber, is characterized in that:

the plug and the retainer have respective engaged portions arranged relative to one another to make the plug be separated from the chamber as the retainer is broken.

DETAILED DESCRIPTION OF THE INVENTION

The invention is disclosed as being embodied preferably in a one-time-use camera. Because the features of a one-time-use camera are generally known, the description which follows is directed in particular only to those elements forming part of or cooperating directly with the disclosed embodiment. It is to be understood, however, that other elements may take various forms known to a person of ordinary skill in the art.

Figure 1:
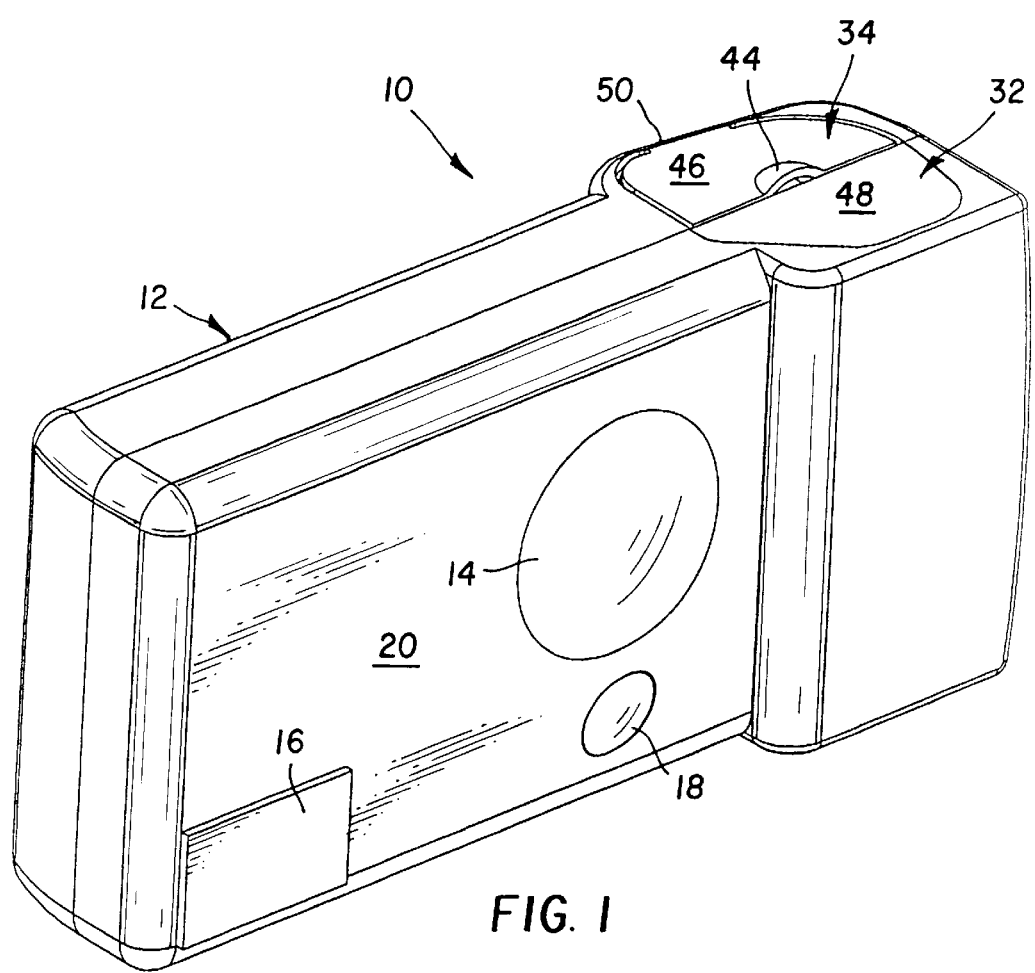
FIG. 1 is a front, bottom perspective view of a one-time-use camera with a break-away retainer for a removable light-tight plug according to a preferred embodiment of the invention, showing the retainer and the plug in tact.
Figure 3:
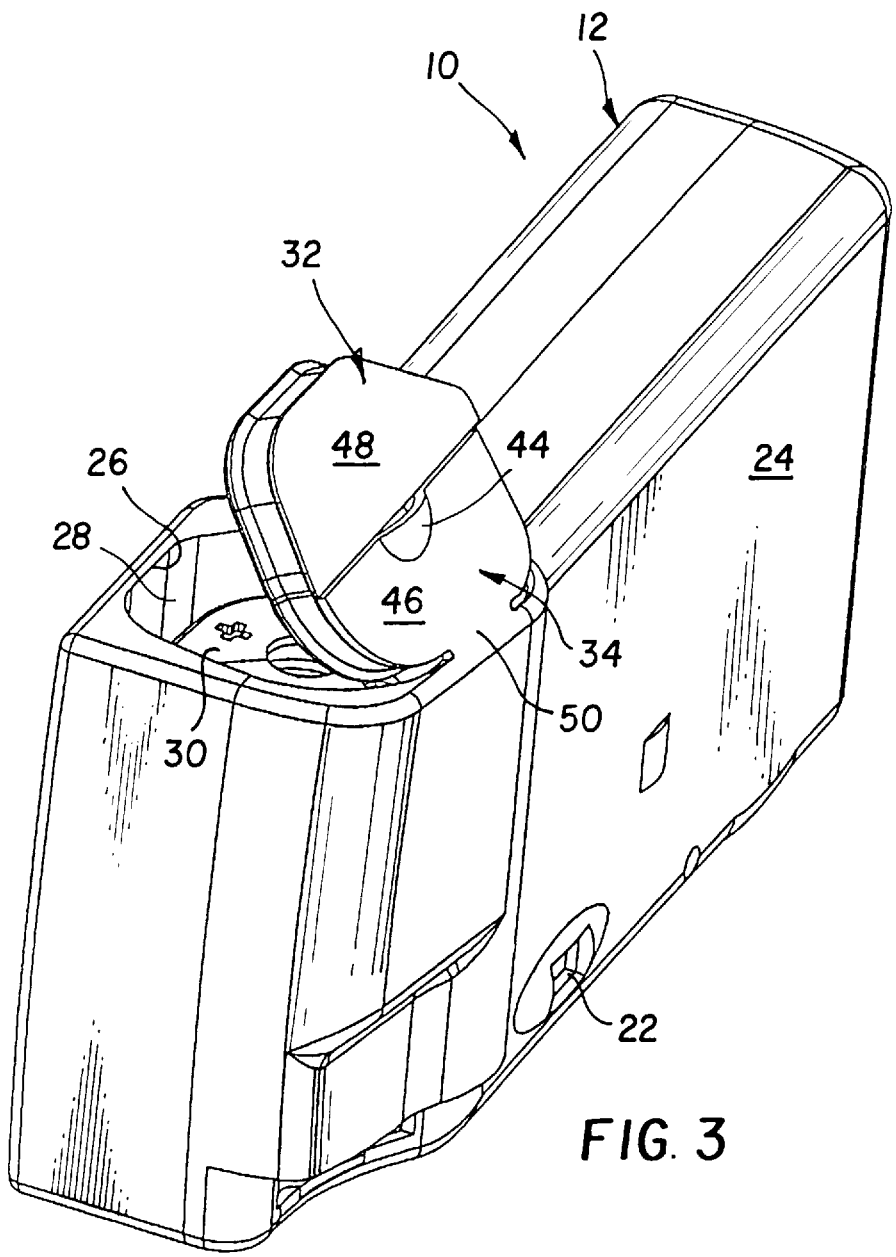
FIG. 3 is a rear, bottom perspective view of the one-time-use camera, showing the retainer broken away from the camera housing and the plug separated from a chamber for a film cartridge.

Referring now to the drawings, FIGS. 1, 3, 4 and 6 show a one-time-use camera 10 having a plastic housing 12. A taking lens 14, a flash emission window 16 and a front viewfinder lens 18 are depicted in FIG. 1 at a front portion 20 of the housing 12. A rear viewfinder lens 22 is depicted in FIG. 3 at a rear portion 24 of the housing 12. A bottom opening 26 in the housing 12 is provided for an internal chamber 28. The chamber 28 contains a film cartridge 30.

Figure 2:
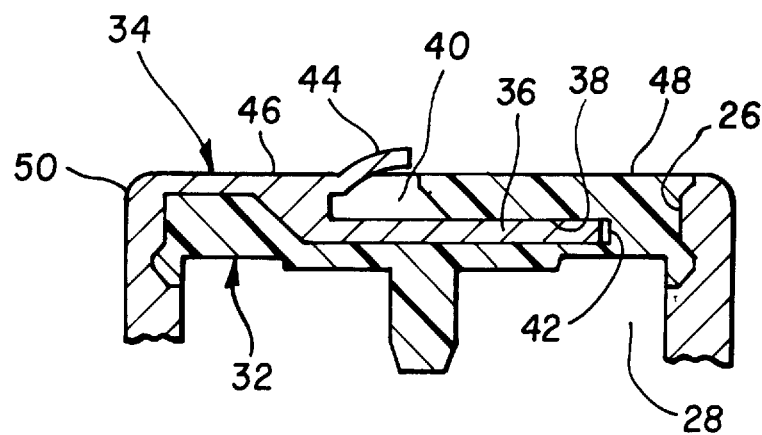
FIG. 2 is a cross-section view of the retainer and the plug as shown in FIG. 1.

A plug 32 light-tightly engages the housing in a known way, within the bottom opening 26, to seal the chamber 28 as shown in FIG. 2. Some details of the plug 32 are disclosed in U.S. Pat. No. 5,600,395, issued Feb. 4, 1997.

The housing 12 includes an integral retainer 34 for the plug 32. The retainer 34 has a relatively rigid projection 36 that extends longitudinally into a slot 38 in the plug 32, beginning at an open end 40 of the slot, in order to mutually engage the plug and the retainer. The other end 42 of the slot 38 is closed. The retainer 34 has a raised or flared tab 44 positioned substantially over the open end 40 of the slot 38, and an exterior flat surface 46 that except for the raised tab is co-planar with an exterior flat surface 48 of the plug 32.

OPERATION

Figure 5:
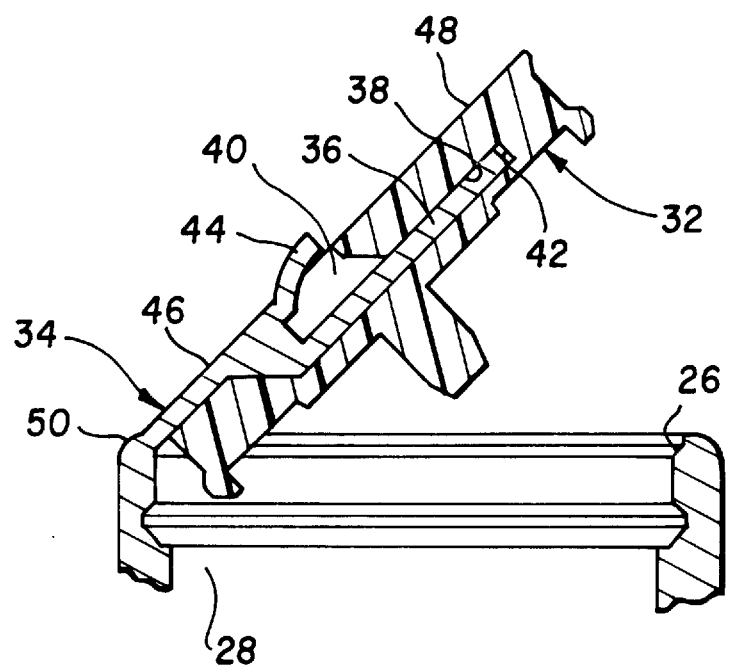
FIG. 5 is a cross-section view of the retainer and the plug as shown in FIGS. 3 and 4.
Figure 4:
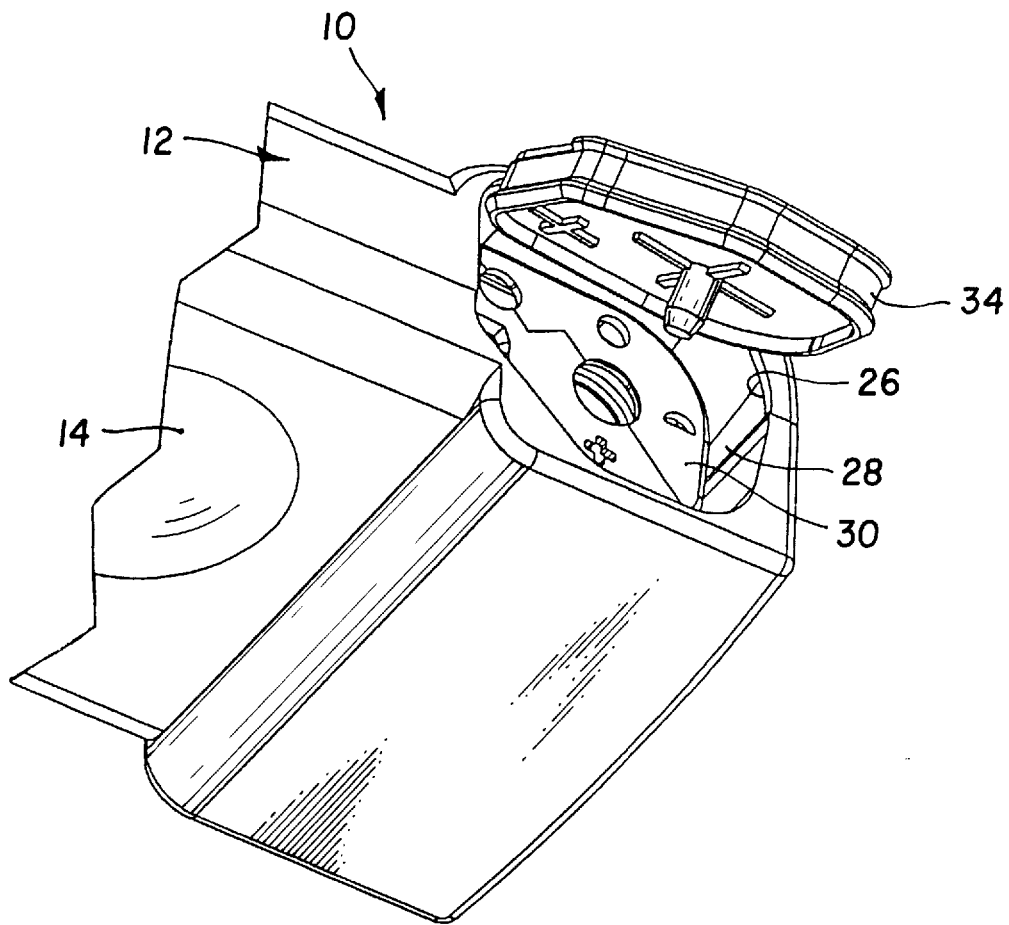
FIG. 4 is a front, bottom perspective view similar to FIG. 3.

Beginning with FIGS. 3–5, the raised tab 44 is grasped manually or otherwise pried to pivot the retainer 34 away from the bottom opening 26. This fractures, i.e. partially breaks away, the retainer 34 from the housing 12 at a weakened frangible area 50 which joins the retainer to the housing.

When the retainer 34 is pivoted away from the bottom opening 26, the projection 36 in the slot 38 forces the plug 32 to pivot with the retainer in order to snap the plug out of the bottom opening. See FIG. 5.

Figure 6:
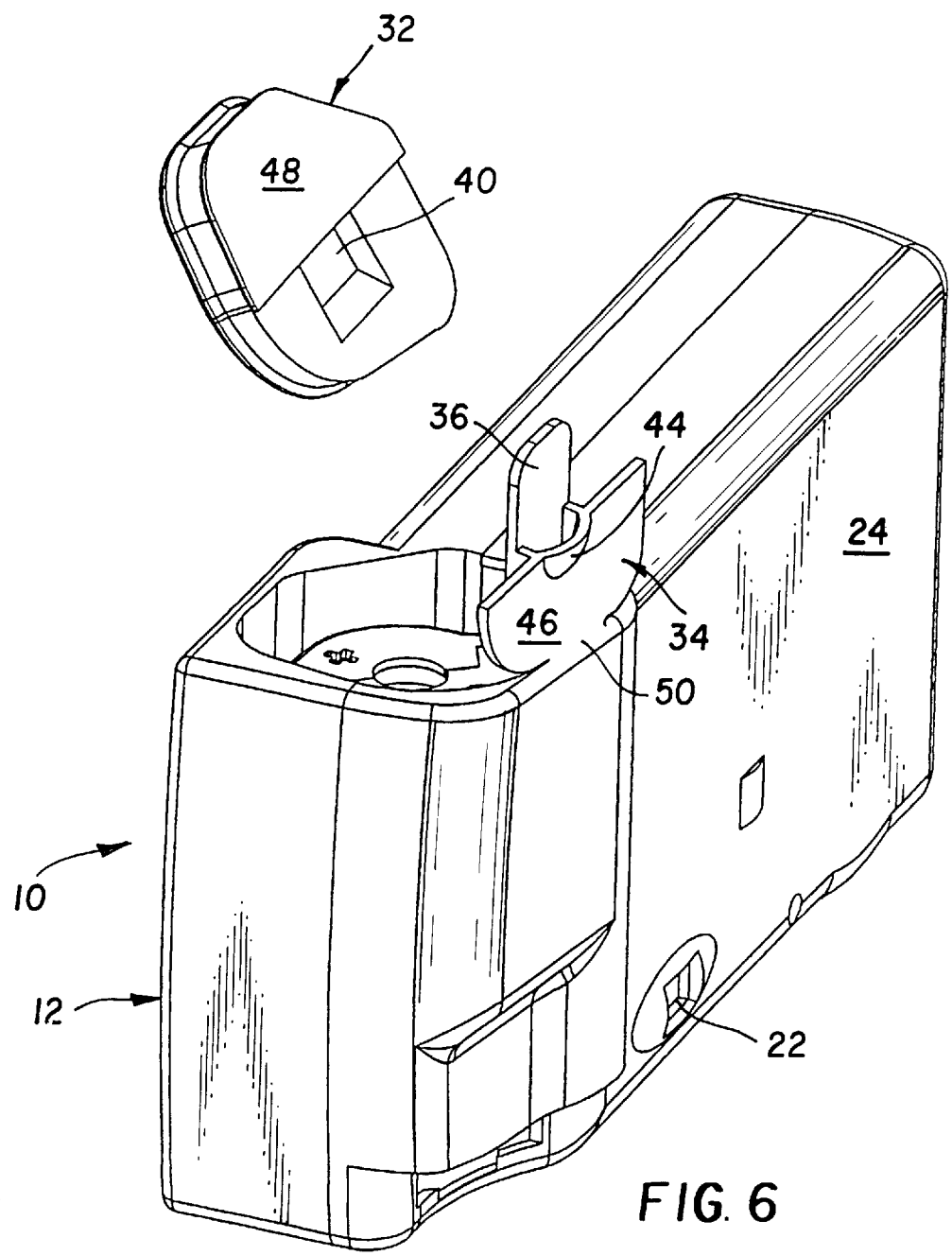
FIG. 6 is a rear, bottom perspective view of the one-time-use camera, showing the plug disengaged from the retainer.
Figure 7:
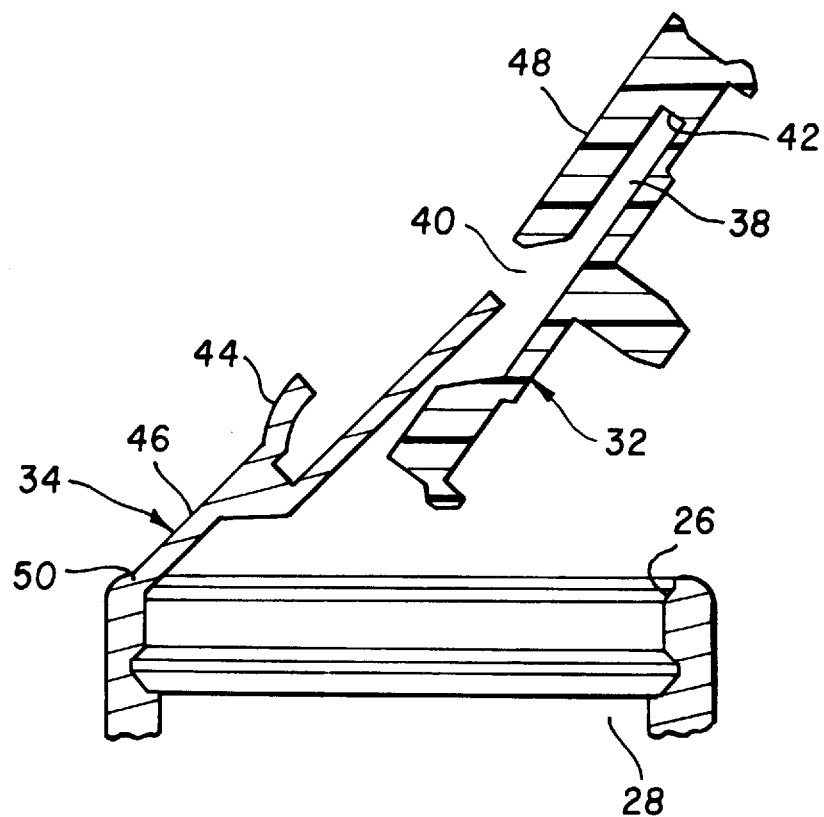
FIG. 7 is a cross-section view of the retainer and the plug as shown in FIG. 6.

Then, as shown in FIGS. 6 and 7, the projection 36 is separated from the slot 38 at the open end 40 in order to disengage the plug 32 and the retainer 34. This separation is one-way only.

The invention has been described with reference to a preferred embodiment. However, it will be appreciated that variations and modifications can be effected by a person of ordinary skill in the art without departing from the scope of the invention.

What is claimed is:

1. A one-time-use camera comprising a plug which must be separated from a chamber to permit removal of an article from the chamber, and a breakable retainer for said plug which is broken to allow the plug to be separated from the chamber, is characterized in that:

said plug and said retainer have respective engaged portions arranged relative to one another, which remain engaged with each other when the retainer is broken, to make the plug be separated from the chamber as the retainer is broken.

2. A one-time-use camera as recited in claim 1, wherein said engaged portions are mutually configured to permit the engaged portions to be disengaged only when said plug is separated from the chamber.

3. A one-time-use camera as recited in claim 2, wherein one of said engaged portions includes a slot having an open end, and the other engaged portion includes a projection which extends through said open end into said slot in order for the engaged portions to be engaged and is separable from the slot only at the open end in order to disengage the engaged portions.

4. A one-time-use camera as recited in claim 3, wherein the engaged portion with said projection includes an external raised tab positioned substantially over said open end to permit said tab to be grasped to break said retainer.

5. A one-time-use camera as recited in claim 4, wherein said engaged portion with the slot has an exterior surface, and the other engaged portion has an exterior surface that except for said raised tab is co-planar with said exterior surface of the engaged portion with the slot.

* * * * *